United States Patent
Kasravi et al.

(10) Patent No.: US 8,554,593 B2
(45) Date of Patent: Oct. 8, 2013

(54) SYSTEM AND METHOD FOR QUANTITATIVE ASSESSMENT OF ORGANIZATIONAL ADAPTABILITY

(75) Inventors: Kas Kasravi, West Bloomfield, MI (US); William T. Rhodes, Frisco, TX (US); Reinier J. Aerdts, Plano, TX (US); Thomas L. Hill, Dallas, TX (US); Edward W. Kettler, III, Plano, TX (US); Jean B. Lehmann, Arlington, TX (US); William J. Markham, Chicago, IL (US); Randall F. Mears, Plano, TX (US); William H. Phifer, Downington, PA (US); Donna M. Stemmer, Papamoa (NZ); Jeffrey L. Wacker, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2318 days.

(21) Appl. No.: 10/818,008

(22) Filed: Apr. 5, 2004

(65) Prior Publication Data
US 2005/0033762 A1   Feb. 10, 2005

Related U.S. Application Data

(60) Provisional application No. 60/460,812, filed on Apr. 5, 2003.

(51) Int. Cl.
*G06Q 10/00*   (2012.01)

(52) U.S. Cl.
USPC .......................... 705/7.11; 705/7.36

(58) Field of Classification Search
USPC ................................. 705/7.11, 7.36
See application file for complete search history.

(56) References Cited

U.S. PATENT DOCUMENTS

| | | | |
|---|---|---|---|
| 2003/0050814 A1* | 3/2003 | Stoneking et al. | 705/7 |
| 2003/0061141 A1* | 3/2003 | D'Alessandro | 705/36 |
| 2003/0065543 A1* | 4/2003 | Anderson | 705/7 |
| 2004/0068431 A1* | 4/2004 | Smith et al. | 705/10 |

* cited by examiner

*Primary Examiner* — Mark A Fleischer

(57) ABSTRACT

A method, system, and computer program product for measuring and assessing an organization's business adaptability is provided. In one embodiment, a taxonomy comprising a hierarchical list of taxonomy indicators that captures organizational elements that can be used to measure an organization's responsiveness to change is created. The taxonomy indicators are industry specific. A set of weights associated with the elements of the taxonomy, indicating a relevant contribution of each element to an overall adaptability of an organization, is assigned. The set of weights are industry specific. An enterprise profile is created assigning a level of adaptability to each taxonomy indicator indicating where, in a range of scores from low to high, an enterprise rates relative to the relevant taxonomy indicator. An adaptability result of the organization from the weights, taxonomy, and enterprise profile is then calculated. The adaptability result provides a quantitative assessment of the organization's adaptability.

15 Claims, 5 Drawing Sheets

| Level 1 | Level 2 | Level 3 | Level 4 |
|---|---|---|---|
| External Relationships | Customers | Degree of Collaboration | Supply chain activities with key customers are proactively managed to create a seamless operation with no redundant operations functions, capital or inventory. |
| | | | The company has a strategy to use its distribution channel trading partners as an extension of its own capabilities to customize products/services, thereby reducing downstream inventories and providing additional end customer value. |
| | | | Customer segmentation is utilized as the basis for investment, product/service offerings, process design, product development, joint operations improvements, channel design, etc. |
| | | Relationship strategy | Customers are segmented and managed based on profit potential and service requirements |
| | | | There is a strategy to take on value-added roles in product development and supply chain management on behalf of customers. |
| | Investment / Analysts Community | Membership Profile | Ratings, recommendations, ability to raise capital |
| | Shareholders | Membership Profile | Public (degree), private |
| Infrastructure | Fixed Assets | Facilities | Utilization, RONA |
| | Strategy | System | Link of IT Strategy to Business strategy |
| | | | Our company has the business intelligence tools to proactively deduct the future trends (e.g., problem management, technology trends, current metrics vs. changing market conditions) |
| | | | Our organization has methods for capturing and retaining the knowledge of its workforce. |
| | | | Our systems (e.g., files and databases) contain knowledge that is easily accessible. |
| | | | Our systems (e.g., files and databases) contain useful knowledge. |
| People/Organization | Employees | Education/training | A formal mentoring program is in place to transfer experience and improve competency of other individuals and workgroups |
| | | | Competency based workforce management techniques are institutionalized |
| | | Motivation | Employees are motivated to succeed. |
| | | | Employees are positive regarding the organizations future. |
| | | | Employees receive timely and meaningful feedback on performance. |
| | | | Empowered workgroups are delegated responsibility and authority over their work processes |

AEI Home                                                              to infoCentre

Agility Index        Taxonomy        Glossary        Suggestions

EDS  Agile Enterprise Index (AEI)

| Features |

AEI Tool
- Organizations
- Profile Index
- Assessment Indices
- Sessions
- Consultation

Taxonomy
- Dimensions
- Categories
- Elements
- Indicators
- Profiles
- View Search people GO
infoCentre GO
EDS*WEB GO detailed searches search tips

Assessment Indices

Organization
Enter Name: EDS
Session Description: EDS is the leading global Information technology (IT) services company. We provide the right strategies, solutions, services and products to help our clients succeed in the digital economy. Here — 402

Select Profile: Communications — 404
This analysis focuses on the communications services at EDS. — 406
— 408

Assessment Inputs
Select Dimension: External Relationships — 410
Select Category: Customers — 412
Select Element: Degree of Collaboration — 414
Select Indicator: The company is actively involved in joint supply chain process impr
Select Value: 6   [Clear Values]   [Update] — 416
Current Values: — 418

External Relationships
  Customers
   Degree of Collaboration
    Supply chain activities with key customers are proactively managed to create a seamless — 420
operation with no redundant operations functions, capital or inventory. — 422
Weight: 7

External Relationships — 424
  Customers
   Degree of Collaboration
    The company is actively involved in joint supply chain process improvement initiatives
    with kow curtomore

[Compute Index]

Assessment Indices — 426

Index # 1
Dimension: External Relationships
Category: Customers
Element: Degree of Collaboration
Indicator: Supply chain activities with key customers are proactively managed to create a — 428
seamless operation with no redundant operations functions, capital or inventory.
Assessment Index = 28

Index # 2
Dimension: External Relationships
Category: Customers

Session Name:  [          ]      [Save Session]
                                              — 430
                          432

Figure 4

SYSTEM AND METHOD FOR QUANTITATIVE ASSESSMENT OF ORGANIZATIONAL ADAPTABILITY

PRIORITY STATUS

This application claims the benefit of the filing date of corresponding U.S. Provisional Patent Application No. 60/460,812, entitled "System and Method for Quantitative Assessment of Organizational Adaptability" filed Apr. 5, 2003. The content of U.S. Provisional Patent Application No. 60/460,812 is incorporated herein by reference for all purposes.

CROSS REFERENCE TO RELATED APPLICATIONS

The present invention is related to an application entitled "A System and Method for Increasing Organizational Adaptability," Ser. No. 10/818,013, filed even date herewith, assigned to the same assignee, and the contents of which are hereby incorporated herein by reference for all purposes.

BACKGROUND OF THE INVENTION

1. Technical Field

The present invention relates generally to the field of computer software and, more specifically, to 2. Description of Related Art Globally, industry is experiencing significant pressure to operate at increasingly higher speeds. Financial markets have a lower tolerance for mistakes or missed opportunities, penalizing companies with large losses in market capitalization and increased costs of capital. Organizations, facing powerful forces such as global competition, the Internet, and customer demand for continuous product and service availability, are required to effectively manage global operations on a round-the-clock basis. This market landscape is characterized by unprecedented volatility and a decreasing organizational life expectancy. The average lifetime of a company in the S&P 500 has fallen from approximately 65 years in the 1930s to approximately 20 years in the 1990s, with the trend projected to continue downward.

Thus, Companies, long focused on functional optimization, now understand that they must optimize enterprise outcomes. This external focus may come at the expense of de-tuning highly optimized internal business silos, but the increased enterprise results will more than make up for any inefficiencies created.

The focus on employees is changing as well. Attempts to accelerate current employee processes by providing more and faster information are leading to information overload and employee burnout. New approaches to how employees work and how they work together are needed to drive the next level of employee productivity. Workforce management and providing an organizational environment for integration is now a required core competency.

The focus on "value-chains" expands to embrace "value-nets" and optimizing the company's processes with immediate suppliers is giving way to a longer view of creating visibility for all members of the network.

The largest change is the focus on change itself. Change moves from something that occurs at irregular intervals to something that occurs continuously. Change becomes integrated into the very fabric of the organization and the ability to capitalize on that change becomes the most critical capability demonstrated by those that thrive in the Innovation Economy.

Customer expectations are also changing. Customers are demanding that businesses change to accommodate their needs, not that they change to accommodate the company's way of working. This shift to customer-centric products and services is quickly becoming a mandate, not an option.

Those companies who are agile will always be offering their customers the best possible products and services. Customers are now able to seed and feed the best solutions where switching costs are minimized. New business models are required every three years whereas this used to be a 10 year cycle. Product life cycles have shortened to six months or less.

Customers are expecting proactive interaction—"bring me the best option/price/capability rather than making me go looking for it" is the requirement of the day. Customers are expecting "local service levels" from global service providers. "You know what I want, you guide my decisions, and you take care of me as an individual customer, not just as one embedded in millions."

To cope with these forces, organizations must become more agile. The reality, however, is that many are built on rigid Information Technology (IT) systems originally designed to optimize functional silos, resulting in inefficient, fragmented business processes and significant delay in accessing critical information. Thus, there is a need for enterprise systems that are more flexible and adaptable, enabling organizations to access the right information at the right time to drive the right decisions. Therefore, there it would be desirable to have a method, system, and computer program product for quantitatively assessing organizational adaptability.

SUMMARY OF THE INVENTION

The present invention provides a method, system, and computer program product for measuring and assessing an organization's business adaptability. In one embodiment, a taxonomy comprising a hierarchical list of taxonomy indicators that captures organizational elements that can be used to measure an organization's responsiveness to change is created. The taxonomy indicators are industry specific. A set of weights associated with the elements of the taxonomy, indicating a relevant contribution of each element to an overall adaptability of an organization, is assigned. The set of weights are industry specific. An enterprise profile is created assigning a level of adaptability to each taxonomy indicator indicating where, in a range of scores from low to high, an enterprise rates relative to the relevant taxonomy indicator. An adaptability result of the organization from the weights, taxonomy, and enterprise profile is then calculated. The adaptability result provides a quantitative assessment of the organization's adaptability.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts an example of a taxonomy in accordance with one embodiment of the present invention;

FIG. 4 depicts an exemplary user interface for use with model 212 in accordance with one embodiment of the present invention.

DETAILED DESCRIPTION OF THE PREFERRED EMBODIMENT

Figure 1:
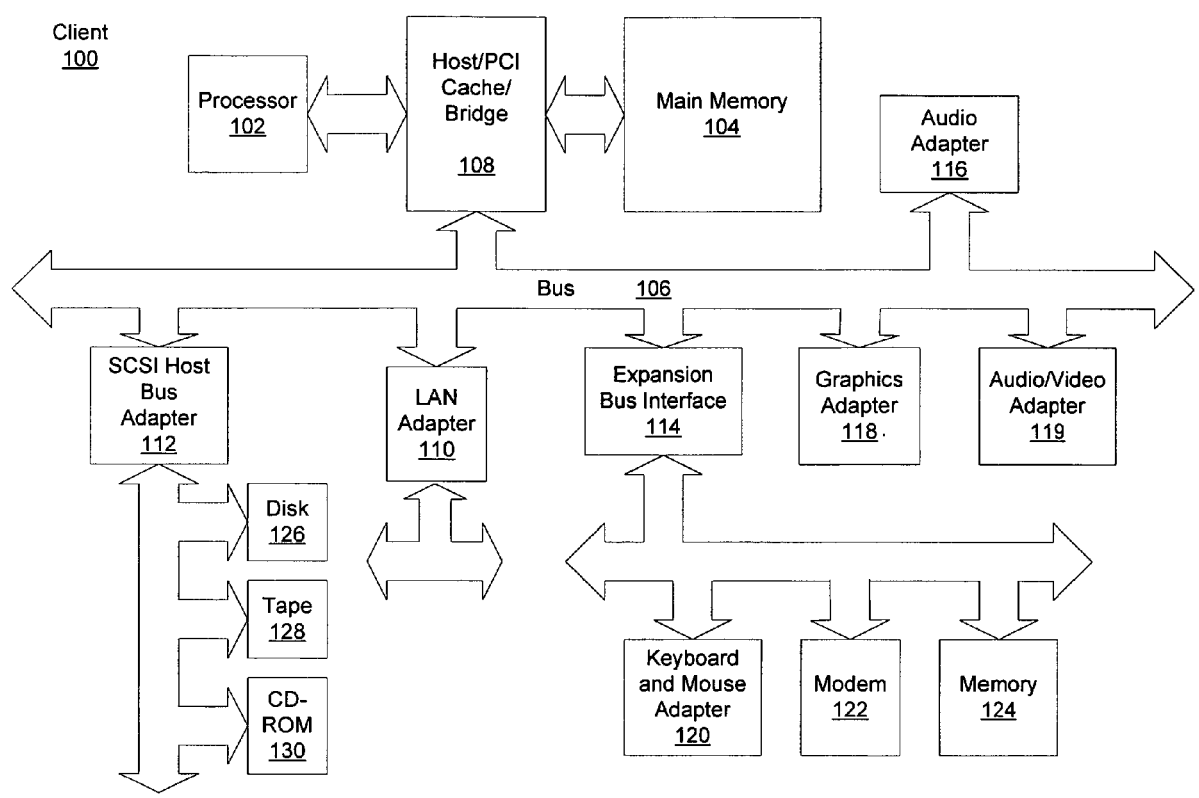
FIG. 1 depicts a block diagram of a data processing system in which the present invention may be implemented.

With reference now to the figures, and in particular with reference to FIG. 1, a block diagram of a data processing system in which the present invention may be implemented is illustrated. Data processing system 100 is an example of a client computer. Data processing system 100 employs a peripheral component interconnect (PCI) local bus architecture. Although the depicted example employs a PCI bus, other bus architectures, such as Micro Channel and ISA, may be used. Processor 102 and main memory 104 are connected to PCI local bus 106 through PCI bridge 108. PCI bridge 108 may also include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. In the depicted example, SCSI host bus adapter 112 provides a connection for hard disk drive 126, tape drive 128, CD-ROM drive 130, and digital video disc read only memory drive (DVD-ROM) 132. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system, such as Windows XP, which is available from Microsoft Corporation of Redmond, Wash. "Windows XP" is a trademark of Microsoft Corporation. An object oriented programming system, such as Java, may run in conjunction with the operating system, providing calls to the operating system from Java programs or applications executing on data processing system 100. Instructions for the operating system, the object-oriented operating system, and applications or programs are located on a storage device, such as hard disk drive 126, and may be loaded into main memory 104 for execution by processor 102.

An Agility Enterprise Index (AEI) tool also runs on data processing system 100. The AEI may be stored, for example, on hard disk drive 124 and loaded into main memory 104 as a set of computer readable instructions for execution by processor 102. AEI is a tool and method for measuring the agility of an enterprise. This tool utilizes a taxonomy of organizational factors, along with a set of customizable weights and scores to quantify the agility of an organization as well as provide insights into actions that would elevate agility. AEI can be applied either to an entire enterprise, or a specific division. When using AEI, care must be taken to distinguish between correlation and causality relationships among the agility factors and the agility of the target business unit.

AEI consists of an Agility Taxonomy, several indices, and a tool for the computation of the indices. The basis for the taxonomy and the indices are considered to be temporally dynamic, requiring frequent updates and validation. When validated, the indices can be used in multiple forms to establish the level of agility of an organization, as well as a consultative tool for defining a plan of action to improve organizational agility.

The phrases "Agile Enterprise," "Organization Adaptability," and "Organizational Agility" are used interchangeably throughout the description of the present invention. The change in use of terminology from one to another should not be taken to imply a difference in scope or meaning of one term with respect to the others.

Those of ordinary skill in the art will appreciate that the hardware in FIG. 1 may vary depending on the implementation. For example, other peripheral devices, such as optical disk drives and the like, may be used in addition to or in place of the hardware depicted in FIG. 1. The depicted example is not meant to imply architectural limitations with respect to the present invention. For example, the processes of the present invention may be applied to multiprocessor data processing systems.

Figure 2:
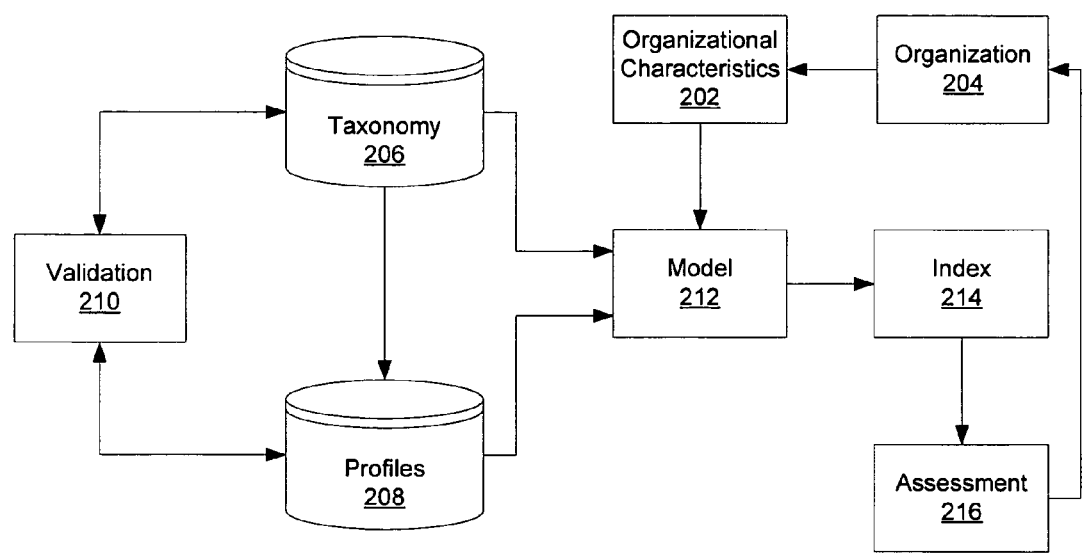
FIG. 2 depicts a block diagram illustrating an exemplary high level overview of the methodology and components for determining an organization's adaptability in accordance with one embodiment of the present invention.

With reference now to FIG. 2, a block diagram illustrating an exemplary high level overview of the methodology and components for determining an organizations adaptability in accordance with one embodiment of the present invention. The present invention offers a system and a method for measuring, assessing, and improving an organization's adaptability. For purposes of the present invention, "Organization" refers to any goal-oriented formal society such as a company, government agency, corporation, division within a corporation, union, association etc., public or private. "Adaptation" is defined as the responsiveness of an organization to changes in external factors such as customer demands, government regulations, the competitive landscape, new technologies etc. A highly adaptable organization can change its structure, processes, and capabilities to benefit from the changes in external factors; but, a less adaptable organization is limited in its capability to respond to external changes, losing competitive advantage to more agile players.

Organizational adaptability is often a subjective matter. The present invention comprehends the subjectivity of the problem, and supports multiple adaptability views of the same organization, in different contexts.

In one embodiment of the present invention, the AEI comprises multiple components and a process for measuring an organization's adaptability, and uses this output for assessment, consultation and implementation purposes. The methodology of the present invention comprises taxonomy 206, profiles 208, an index 214, a model 212, a validation process 210, organizational characteristics 202 and an organization 204.

Taxonomy 206 is a hierarchical list that captures the organizational elements that can be used to measure or predict an organization's responsiveness to change. A single or multi taxonomies may be utilized. An example of a taxonomy 206 is illustrated in FIG. 3. Taxonomy 300 depicted in FIG. 3 includes four hierarchical levels each populated with several items. For example, level 1 includes the items of "External Relationships", "Infrastructure", and "People/Organization".

Each of these level 1 items has several level 2 items associated with it. For example, "External Relationships" has level 2 items "Customers", "Investment/Analysts Community", and "Shareholders" associated with it. Each of these items has one or more level three items associated with it.

The taxonomy 206 primarily relies on the expertise of the consultant, which is industry-specific (in fact the index itself is also industry-specific). The weights of the elements within the taxonomy 206 may be based on the knowledge of consultants (at least at the starting point), but will rely on the analysis of empirical data —this analysis is based on creating two lists of companies, one considered agile, and one not. Then, through the applications of data mining and statistical analysis, we determine the contribution of each element of the taxonomy 206, and thus the associated weight for the computation of the index. This analysis produces correlations among the elements and enterprise agility that may be either linear or non-linear.

Profiles 208 is a set of weights associated with the elements of the taxonomy which indicate the relevant contribution of each element to the overall adaptability of an organization. Multiple profiles 208 may be present to assess the organization in different contexts.

To better understand the concept of profiles 208, consider the example of a startup software company versus a mining company. Such a software company must develop new products, test them, and market them very rapidly, as well as be prepared to discontinue the product and start a whole new line of products very rapidly—or, it will be out of business. In contrast, a mining company, with significant investments in capital equipment can not and will not make changes to its core business so rapidly; instead, they will need to change in other ways such as improving procurement and discovering new mining locations. So, what contributes to adaptability in one industry may be very different than another. These contributions can be captured via sets of weights on the taxonomy elements. Each of these sets is represented as a profile. So, the profile for a startup software company may have high weights for product development, and the profile for a mining company may have very low weights for new product development, but high weights for making changes to the internal administrative processes.

Index 214 is a set of algorithms that calculate and quantify the adaptability of an organization 204. The index 214 may measure organizational adaptability at various levels of detail (e.g., coarse to fine), as defined by the taxonomy. The index 214 comprehends the context of analysis using profiles' 208 weights. The index 214 also establishes confidence factors based on the available input and profiles' 208 weights. There are many different algorithms for computing the confidence factors which will be well know to those of skilled in the art. One example of an algorithm for computing the confidence factor is:

$$ICF=(NE*SW)/(TNE*STW)$$

Where, ICF is the Index Confidence Factor, NE is the total number of elements (from the taxonomy 206) that were actually used to calculate the index (since not all questions about the elements may be answered), SW is the sum of the weights of the elements that were used to calculate the index 214, TNE is the total number of the elements in the taxonomy 206, and STW is the sum of all the weights of the elements in the taxonomy 206. It should be noted that the confidence factor is typically a relative measure and not an absolute one.

Model 212 (also referred to as an AEI Computation Tool) is a tool for implementing the calculation of the Index, implemented on a data processing system, such as, for example, data processing system 100 depicted in FIG. 1, and comprising a user interface, a database, and representations of the taxonomy 206 and the profiles 208. Furthermore, the model 212 provides tools for saving work in progress, managing a glossary, viewing the content of the database, and invoking analysis and consultation sessions.

Validation 210 is a process that verifies the assumptions in the taxonomy 206 and profiles 208. This validation 210 process includes collection and use of empirical data, clustering and correlation analysis, visualization, data mining, and other techniques. Validation 210 prunes and adjusts the taxonomy 206, and establishes optimal profile 208 weights. Due to the dynamic nature of the business environment, the process of Validation 210 should be conducted frequently.

The validation 210 process is the same as the initial setup process. It is in fact manual for the taxonomy 206, but could be automated for the weights of the elements in the taxonomy 206. The validation 210 is important because the business factors that contribute to adaptability or the need for adaptability can change over time. The taxonomy 206 is validated by industry consultants reviewing the existing taxonomy 206 and updating it's elements; for example, in the automotive industry, the rate at which embedded systems are used could be much more significant in year 2005 than it was in 2000. The weights are updated via data mining and statistical analysis, just to make sure that the contributions of the taxonomy 206 elements to adaptability is up-to-date.

Another component of the methodology of the present invention is assessment 216. Assessment 216 is a process that includes evaluating an organization's characteristics 202, as defined by the taxonomy 206, selecting an appropriate profile 208, and calculating an index 214 using the model 212 after the validation 210. The assessment 216 is a manual process as traditionally performed by consultants. Thus, the Assessment 216 function simply delegates the use of the index 214 to consultants who will in turn further study a company's operations and provide recommendations for changes.

Referring now to FIG. 4, an exemplary user interface for use with model 212 is depicted in accordance with one embodiment of the present invention. User interface 400 allows a user to enter data and descriptions, manage a glossary, view the content of the database, invoke analysis and consultation sessions, and save work in progress.

User interface includes an organizational name entry block 402 allowing a user to enter that name of an organization under analysis as well as a session description entry box 404 allowing the user to enter a description of the organization and purposes of the analysis. A profile drop down menu 406 is provided allowing a user to select a profile for which the analysis is focused. A profile description entry box 408 is also provided to allow a user to enter explanatory notes and other data associated with the profile selected.

The user interface 400 also provides assessment inputs 410-416 as well as an indicator value input 422. Buttons 416 and 418 allow a user to clear values or update as desired. A current value display window 424 allows a user to view the current values for each assessment input and a compute index button 426 allows a user to instruct the AEI tool to compute an index as is discussed in more detail below.

An assessment indices window 428 provides the user with the results of the computing the index allowing the user to observe the quantitative assessment index with explanations. The user may save the session and results, if desired, by entering a session name in the session name input box 432 and selecting the save session button 430.

User interface 400 is an example of a user interface that may be used in conjunction with the tools for determining quantitative assessment of organizational adaptability of the present invention. However, as those skilled in the art will recognize, other user interfaces may be utilized as well.

Figure 5:
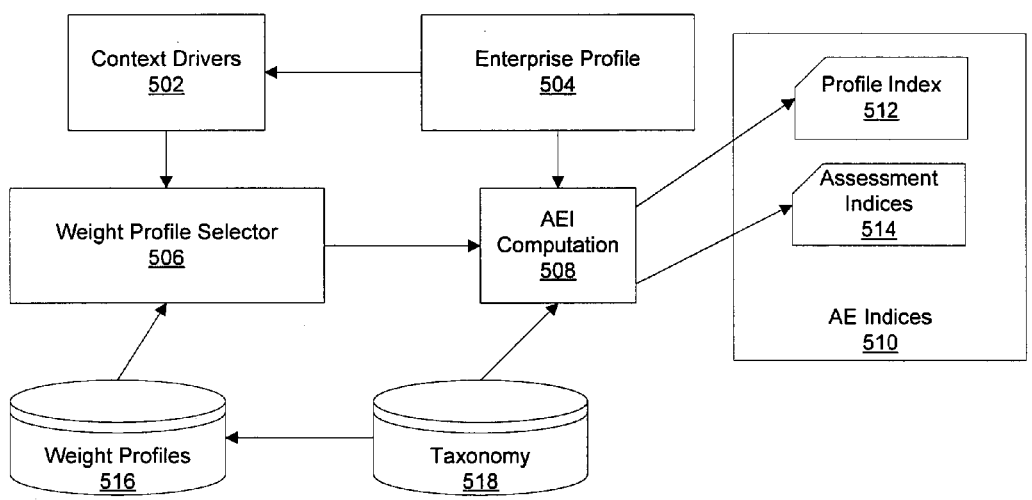
FIG. 5 depicts a block diagram illustrating an exemplary process by which an agility enterprise index may be calculated in accordance with one embodiment of the present invention.

With reference now to FIG. 5, a block diagram illustrating an exemplary process by which an agility enterprise index may be calculated is depicted in accordance with one embodiment of the present invention. Agility Enterprise Index (AEI), which may be implemented as, for example, model 212 in FIG. 2, is a tool and method for measuring the agility of an enterprise. This tool utilizes a taxonomy of organizational factors, along with a set of customizable weights and scores to quantify the agility of an organization as well as provide insights into actions that would elevate agility. AEI can be applied either to an entire enterprise, or a specific division. When using AEI, care must be taken to distinguish between correlation and causality relationships among the agility factors and the agility of the target business unit.

AEI consists of an Agility Taxonomy 518, several indices 510 (e.g., profile index 512 and assessment indices 514), and a AEI Computation tool 508 for the computation of the indices 510. The basis for the taxonomy 518 and the indices 510 are considered to be temporally dynamic, requiring frequent updates and validation. When validated, the indices 510 can be used in multiple forms to establish the level of agility of an organization, as well as a consultative tool for defining a plan of action to improve organizational agility.

The computation of AEI is based on a taxonomy of an enterprise attributes. The organization of the taxonomy 518 defines the enterprise attributes that correlate with enterprise agility in a hierarchical manner, consisting of pertinent terms, questions, and issues. It is also understood that the taxonomy 518 is a living representation and will need to be updated on a regular basis. As described above, an exemplary taxonomy is depicted in FIG. 3. In one embodiment, as depicted in FIG. 3, the AEI taxonomy is may be organized in four levels, as follows:

Dimension The highest level of the taxonomy, which defines the context of the measures
Category Subdivides the Dimension
Element Refines the Category into measurable components
Indicator The actual attribute to be measured The items in the taxonomy 518 may be duplicated in different branches. However, any such item is in fact measuring a different aspect of an enterprise in a different context as defined by the hierarchy of the taxonomy 518. It should be noted that the number of levels in the taxonomy does not have to be four, but may be one or more levels depending on the industry, the organization, and the level of detail accuracy desired in the results.

The enterprise attributes defined in the taxonomy 518 are believed to be dynamic over time. Therefore, it is preferable to update the taxonomy 518 on a regular basis. The frequency of the updates will be a function of the attributes as well as changes in the economy and market place. A governance body may be required to determine the necessity for any updates. Therefore, any use of AEI must be in the confines of a specific timeframe.

The taxonomy 518 is used as a tool to score the AEI for an enterprise. Each indicator in the taxonomy 518 is given a relative weight stored in weight profiles 516, which implies the contribution or association of the indicator with an enterprise's agility. When analyzing an enterprise, each indicator is assigned a score, for example 1 (low)-7 (high); the scores are multiplied by the weights for each indicator, summed up, and normalized into a 0-100% range.

Each indicator in the taxonomy 518 is assigned a relative weight. The weights are multiplied by the Score for each indicator when calculating the indices 510. A weight may be a single number (e.g., 42) or a function of other indicators. Care must be taken to avoid self-referencing functions.

The agility of enterprises must be measured in a proper context. Factors such as the industry and government regulations impact an enterprise's capacity to be agile. Therefore, any mechanism for measuring the AEI must comprehend the natural capacity for change. AEI uses the notion of weight profiles 516 to adjust the agility measures, so that enterprises may be fairly assessed along a common scale, analogous to handicap in golf.

Each weight profile is a separate set of weights for the indicators. The criteria for the weight profile are essentially the agility factors beyond an enterprise's control. Examples of such factors are:

Industry
Market threat levels
Capital intensiveness
Government regulations

A single index can not possibly measure every aspect of the factors that lead to an enterprise's agility. Therefore, the AEI model implements multiple indices (profile 512 and assessment 514) to enable the measurement of agility at different levels and along appropriate dimensions, as well as a confidence factor for each index 512 and 514 to allow for any ambiguities in the assessment process.

The profile index 512 is a single number, 0-100%, which provides a coarse and high-level indication of an enterprise's agility. The profile index 512 does not comprehend any details, causes, or corrective actions. This index 512 is typically based on publicly available information. This index is obtained by the normalized sum of the scores (1-7) assigned to each dimension, multiplied by the dimension's weight. The weight for each dimension is the average of the weights of the dimension's indicators.

The Assessment Index 514 is in fact a set of indices that can be used to measure the specific factors that impact agility. This index 514 provides insights into the organization issues that affect agility, thus can be used as a tool to improve agility. This index 514 is based on a detailed analysis of an enterprise, typically requiring interviews and access to information not publicly available. This index is obtained by the normalized sum of the scores (1-7) assigned to each indicator, multiplied by the indicator's weight.

The Profile and Assessment Indices may be compared as follows:

| Profile Index | Assessment Index |
| --- | --- |
| High-level index | Detailed indices |
| A single index (0-100%) | Multiple indices, one for each dimensions (0-100%) |
| Based on publicly available information | Based on direct client interviews |
| Used for opportunity discovery | Used for detailed assessment and consultation |

Each index 512 and 514, as noted above, will be calculated based on certain inputs. It is quite possible that the calculations may be based on incomplete or ambiguous information. Therefore, a confidence factor (%) is also calculated for each index 512 and 514. The confidence factor is based on the completeness and certainty of the inputs.

As mentioned above, the taxonomy 518 is the agility taxonomy described, for example, via dimensions, categories, elements, and indicators. The weight profiles 506 are a set of unique indicator weights to be applied by AEI computation 508 to the elements within taxonomy 518. Enterprise profile 504 is a set of responses (for example, 1-7 scores) to issues defined by the taxonomy indicators. The context drivers 502 are a sub-set of the enterprise profile 504 used for selecting an appropriate weight profile from weight profiles 516. The weight profile selector 506 is a tool for selecting a suitable weight profile based on the context drivers 502. AEI Computation 508 calculates the indices 510 and confidence factors. The AEI indices 510 are the output, consisting of a single profile index 512 and a set of assessment indices 514 and confidence factors.

The agility index 510 can be a key tool in an approach to enterprise agility improvement. During the initial assessment, the tool 510 aids in benchmarking current levels of agility and estimating the size of the improvement opportunities. Its output is key to tailoring an "agility roadmap"—an agility improvement program for the client's unique situation. On an ongoing basis, the tool 510 provides a measurement and assessment platform for gauging progress and for fine tuning or redirecting the improvement program as conditions change.

In an initial assessment, the index tool 510 can be used to calibrate and score current levels of performance across a wide range of agility indicators covering the key dimensions of the enterprise. Included are indicators of agility for the enterprise's current processes, practices and assets, and for its improvement initiatives both planned and underway. Indicators also measure performance on key agility metrics.

Individual indicator scores can be aggregated into elements and categories within each dimension. This sets the agility baseline for the enterprise as a whole, and for relevant operating units, geographies or other organizational units. Next, the tool 510 can be used to determine and select appropriate "best agile" benchmark targets for the enterprise that reflect the unique characteristics of its industry and operating environment.

Comparing the agility indicators with the benchmarks, the tool 510 can then be used to determine the size of the gaps between baseline and "best agile." Drawing on improvement benchmark databases, the tool helps to estimate the benefit/ROI opportunity based on the size of the gaps. Finally the tool 510 classifies and arrays each gap on a criticality (green-yellow-red) scale based on the size of the gap and how important closing that gap is toward achieving the enterprise's strategy and goals.

As a part of the overall assessment process, the tool helps provide unique insight and guidance to executives. The rigor and breadth of coverage embodied in the index tool 510 helps to:

Provide a holistic review of the enterprise's agility and opportunities to improve it.
Demonstrate enterprise executive sponsorship and commitment to a "clean sheet" look at the enterprise's capabilities and willingness to address change in the innovation economy
Ensure a fact-based objective view without bias or politics
Create a safe "trusted broker" environment for raising issues without attribution, and avoid sugar coated or politically based results that might have come from an internal assessment
Confirm the value of specific processes and infrastructure towards driving agility
Pinpoint high and low impact areas for improvement—efficiently and effectively
Identify cross-business unit opportunities for best practice transfer within the enterprise and for working together on shared agility improvement actions and investments where synergies are possible
Establish realistic goals based on relevant benchmark targets and the organization's ability and readiness for change
Clarify the timing and magnitude of results and payback
Increase confidence in the value opportunity and ROI of agility improvements
Support the business case needed to achieve executive level consensus and organizational buy-in These insights drive the design of an "agility roadmap", a prioritized, time-phased improvement program that focuses the entire organization on agility and is tailored to the future needs and current capabilities of the organization.

Prioritizing improvement actions begins with a solid understanding of the impact and ease of implementing each opportunity.

Gauging impact includes understanding the size and payback associated with the opportunity. It also includes understanding the strategic importance of the improvement—e.g.; does it create or enhance a critical capability for the future? It also includes an understanding of the indirect benefits that the improvement can bring, such as demonstrating success and developing confidence within the organization to take on more challenging actions.
Understanding ease of implementation requires looking at a range of considerations. How easy will it be to get leadership and the organization to sign up for and believe in this initiative? How many parts of the organization are needed to make it happen? Can sufficient funding be made available? Do we have enough of the right skills? Will we commit the right people? Will our measurement and reward systems be a barrier? Does the initiative require cooperation of outside parties (e.g.; customers and suppliers) and what is required to get them onboard? How long will it take before it starts to generate success? Is the risk beyond our current tolerance?

Sequencing is also important. Some improvements will be foundational, in areas that need to be shored up before other, more sophisticated actions are taken. Some improvements may produce significant short-term payback, thereby helping to fund other improvements. Some may simply be "must-haves" to respond to a window of opportunity or a pressing customer requirement. And even so, virtually no organization has the resources or the capacity for change to launch all potential initiatives simultaneously.

Most enterprises already have a number of initiatives underway (e.g.; systems implementation, CAPEX projects, process improvements and transformational programs like Six Sigma). Some of these initiatives may directly support or complement new agility-oriented initiatives. Others may no longer be as attractive a place to invest resources. Others still may be at odds with the new agility agenda. The design of the agility roadmap needs to factor-in existing programs and accelerate, decelerate, integrate, redirect and/or kill those initiatives based on the fit with the array of opportunities identified in the agility assessment.

The agility index tool provides a foundation for ongoing agility improvement in the enterprise.

First, beginning with the initial assessment, the tool 510 helps establish and promote a common framework and a common language for communicating about agility measurement and improvement within the enterprise. The organization can use this verify (or expand) its current thinking on what agility means and to focus its efforts going forward.

Second, the index helps create a basis for measuring the total value received from improving agility. The index tool's 510 linkage between improvement actions and benefits/ROI helps to define balanced scorecard components related to ongoing agility improvement.

Finally, the index 510 also helps clients to reassess and reprioritize the agility roadmap as the enterprise makes improvements. The tool 510 helps make possible a cost-effective assessment process, based on repeatable, efficient agility assessment methods. Also, the index tool 510 is refreshed and updated to reflect new levels of best agile so that enterprises can track their competitive agility position over time.

Agility of an enterprise consists of both tangible and intangible measures. Any index that attempts to quantify the agility of an enterprise must recognize inherent ambiguities, the dynamic nature, and the perceptions involved. Therefore, validation of an index plays a significant role in designing and maintaining such an index. Validation of an agility index will consist of two distinct but necessary components, as follows:

1. Consultation with Domain Experts—This activity consists of reviews with individuals who are experienced with enterprise agility and organizational factors that affect agility.
2. Empirical Data Analysis—This activity consists of testing the computational components and technical assumptions against empirical data. Two lists of enterprises will be used as test cases; one list contains enterprises that are recognized as agile, and the other list includes organizations that are considered to be not agile. The analysis consists of both discovering patterns and clusters that are uniquely common to each type of organizations, as well as verification of initial assumptions.

Due to market dynamics, the agility index 510 should to be validated on a regular basis.

The agile enterprise must always learn to adapt, that is incessantly modifying the economic structure from within, to keep pace with the incessant demands for renewal that are constantly furnished by the innovation economy environment.

What do owners do in this process? They provide risk capital. When an owner provides equity, he absorbs the time lag between costs and revenues, a time lag that may never be bridged. However owners are not gamblers—they should not be. Owners have to confront and manage the risks that their investments are being exposed to. They must be, in fact, concerned with the reduction or the elimination of the fundamental risks that their business operations are involved in.

Therefore, the competence that owners must demonstrate is two-fold, both of which are equally important:
Rational allocation of capital, and
Reduction (or elimination) of the fundamental business risks.

The external environment constantly forces owners to examine their capital allocation efficiency and ability to go through the process of constant renewal. It means not only being able to handle the risks of new innovations, but also mastering these new risks—for new risks also mean new opportunities.

All systems-thinking is based on feedback loops that use the principles of positive and negative feedback. Applied to businesses, renewing an established way of doing business without changing its fundamental structure would be an example of negative feedback whereas being agile in renewal, that is, developing a new way of doing business or fundamentally renewing an existing one would be an example of positive feedback. An owner will always be faced with difficult decisions as to which feedback loop to utilize in relation to his external environment. Risk mitigation also comes by constantly embracing these difficult decisions.

The AEI demonstrates how agility based decisions affect the net present value of cash to shareholders. This tool 510 is used at two levels within a company: the operating business unit and the corporation as a whole. Within business units, the AEI measures the value the unit has created by analyzing cash flows over time.

At the corporate level, the AEI provides a framework to assess options for increasing value to shareholders: the framework measures tradeoffs among reinvesting in existing businesses, investing in new businesses, and returning cash to stockholders.

The innovation economy's shrinking competitive advantage periods (CAPs) necessitate that an investor as well as a manager understands the agility and quickness dynamics of organizational change and the mental models that owners need to have not only sense and respond but rather to anticipate in order to keep up with the incessant change.

The use of the AEI begins with a comprehensive assessment of an organization's business agility from front-line customers to shareholders. The AEI identifies key drivers of total shareholder return now and in the future, and measures:
Strategic momentum
Structure and processes
Competitive positioning
Operational performance
Organizational culture Use of the AEI is in conjunction with such tools as the shareholders' value analysis will allow the anticipation of future change that is factored into the shareholders' value analysis. When performing a shareholders' value analysis, a manager should perform three analyses:
Determine the actual costs of all investments in a given business, discounted to the present at the appropriate cost of capital for that business;
Estimate the economic value of a business by discounting the expected cash flows to the present at the weighted average cost of capital;
Determine the economic value added of each business by calculating the difference between the net present value of investments and cash flows.

AEI can be used both as a tool to aid in strategic decisions and to guide normal decision-making throughout the organization. When used as an everyday tool by managers, the AEI can be applied in many ways to:
Anticipate the performance of the business or portfolio of businesses
Since AEI accounts for the profiles of industries serviced by a business unit as well as the business unit itself, it provides a clear understanding of value creation or degradation over time within each business unit.
Test the business plans' Assumptions
By understanding the fundamental drivers of agility in each business, and in the industry and region served by the business, management can test assumptions used in the business plans. This provides a common framework to discuss the soundness of each plan.
Prioritize Options to meet each business's full potential
This analysis illustrates which options have the greatest impact on value creation, relative to the investments and risks associated with each option. With these options clearly understood and priorities set, management has a foundation for developing a practical plan to implement change.

The AEI will enable focused initiatives on people, supply chains, systems, and environments that:
Know why and what to measure
Enable systematic measurement activities
Make the AEI integral to achieving agility
Close the assessment loop—act on what you measure It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in computer system having a processor and a memory, for measuring and assessing an organization's business adaptability, the method comprising:
creating a taxonomy in the memory, the taxonomy comprising a hierarchical list of taxonomy indicators that captures organizational elements that can be used to measure an organization's responsiveness to change wherein the taxonomy indicators are industry specific;
assigning a set of weights associated with the elements of the taxonomy, indicating a relevant contribution of each element to an overall adaptability of an organization, wherein the weights are industry specific, wherein the weights are stored in the memory, and wherein the weights are determined from a data comparison of the organizational elements for a predetermined set of agile organizations to the organizational elements for a predetermined set of non-agile organizations;
determining an enterprise profile for the organization from a series of organization specific inputs into the computer system; and
calculating an adaptability result of the organization from the weights, taxonomy, and enterprise profile with the processor, wherein the adaptability result provides a quantitative assessment of the organization's adaptability, and wherein the adaptability result includes a profile index providing an indication of an enterprise agility, and one assessment index providing an indication of specific factors used in determining the indication of enterprise agility, and a confidence factor providing an indication of completeness of the enterprise profile.

2. The method as recited in claim 1, wherein the enterprise profile is a set of responses to issues defined by the taxonomy indicators.

3. The method as recited in claim 2, wherein the set of responses comprise a set of responses selected from a finite number of selection numerals that represent a range of adaptability from low to high for a given taxonomy indicator for the organization.

4. The method as recited in claim 1, further comprising determining a confidence factor based on the enterprise profile wherein the confidence factor is a score indicating the confidence of the adaptability result based on the confidence in the completeness and accuracy of the results provide by the enterprise profile.

5. The method as recited in claim 1, wherein the number of levels in the hierarchy list of taxonomy indicators is determined by the organization and industry to which the organization belongs.

6. A computer program product in a computer readable media for use in a data processing system for measuring and assessing an organization's business adaptability, the computer program product comprising:
first instructions for creating a taxonomy comprising a hierarchical list of taxonomy indicators that captures organizational elements that can be used to measure an organization's responsiveness to change wherein the taxonomy indicators are industry specific;
second instructions for assigning a set of weights associated with the elements of the taxonomy, indicating a relevant contribution of each element to an overall adaptability of an organization, wherein the weights are industry specific and wherein the weights are determined from a data comparison of the organizational elements for a predetermined set of agile organizations to the organizational elements for a predetermined set of non-agile organizations;
third instructions for determining an enterprise profile for the organization; and
fourth instructions for calculating an adaptability result of the organization from the weights, taxonomy, and enterprise profile, wherein the adaptability result provides a quantitative assessment of the organization's adaptability, and wherein the adaptability result includes a profile index providing an indication of an enterprise agility, an one assessment index providing an indication of specific factors used in determining the indication of enterprise agility, and a confidence factor providing an indication of completeness of the enterprise profile.

7. The computer program product as recited in claim 6, wherein the enterprise profile is a set of responses to issues defined by the taxonomy indicators.

8. The computer program product as recited in claim 7, wherein the set of responses comprise a set of responses selected from a finite number of selection numerals that represent a range of adaptability from low to high for a given taxonomy indicator for the organization.

9. The computer program product as recited in claim 6, further comprising determining a confidence factor based on the enterprise profile wherein the confidence factor is a score indicating the confidence of the adaptability result based on the confidence in the completeness and accuracy of the results provide by the enterprise profile.

10. The computer program product as recited in claim 6, wherein the number of levels in the hierarchy list of taxonomy indicators is determined by the organization and industry to which the organization belongs.

11. A system for measuring and assessing an organization's business adaptability, the system comprising:
first means for creating a taxonomy comprising a hierarchical list of taxonomy indicators that captures organizational elements that can be used to measure an organization's responsiveness to change wherein the taxonomy indicators are industry specific;

second means for assigning a set of weights associated with the elements of the taxonomy, indicating a relevant contribution of each element to an overall adaptability of an organization, wherein the weights are industry specific and wherein the weights are determined from a data comparison of the organizational elements for a predetermined set of agile organizations to the organizational elements for a predetermined set of non-agile organizations;

third means for determining an enterprise profile for the organization; and fourth means for calculating an adaptability result of the organization from the weights, taxonomy, and enterprise profile, wherein the adaptability result provides a quantitative assessment of the organization's adaptability, and wherein the adaptability result includes a profile index providing an indication of an enterprise agility, an one assessment index providing an indication of specific factors used in determining the indication of enterprise agility, and a confidence factor providing an indication of completeness of the enterprise profile.

12. The system as recited in claim 11, wherein the enterprise profile is a set of responses to issues defined by the taxonomy indicators.

13. The system as recited in claim 12, wherein the set of responses comprise a set of responses selected from a finite number of selection numerals that represent a range of adaptability from low to high for a given taxonomy indicator for the organization.

14. The system as recited in claim 11, further comprising determining a confidence factor based on the enterprise profile wherein the confidence factor is a score indicating the confidence of the adaptability result based on the confidence in the completeness and accuracy of the results provide by the enterprise profile.

15. The system as recited in claim 11, wherein the number of levels in the hierarchy list of taxonomy indicators is determined by the organization and industry to which the organization belongs.

* * * * *